United States Patent [19]

Brown et al.

[11] 4,454,863

[45] Jun. 19, 1984

[54] SOLAR HEAT COLLECTING PANEL ASSEMBLY AND METHOD FOR COVERING STRUCTURES

[76] Inventors: Donald P. Brown, 2901 E. Hillcrest, Orange, Calif. 92667; Ian R. Jones, 30817 Via Rivera, Rancho Palos Verdes, Calif. 90274; Victor V. Vurpillat, 30751 Greens East Dr., Laguna Niguel, Calif. 92677

[21] Appl. No.: 718,665

[22] Filed: Aug. 30, 1976

[51] Int. Cl.³ .............................................. F24J 3/02
[52] U.S. Cl. .................................. 126/432; 126/445; 126/DIG. 2; 52/533
[58] Field of Search ............... 237/1 A; 126/271, 270, 126/432, DIG. 2, 444, 417, 445, 450; 52/518, 533; 165/116, 169, 170

[56] References Cited

U.S. PATENT DOCUMENTS

| | | | |
|---|---|---|---|
| 2,624,298 | 1/1953 | Farren | 52/533 |
| 3,893,506 | 7/1975 | Laing | 237/1 A |
| 3,995,804 | 12/1976 | Folds et al. | 237/1 A |
| 3,996,918 | 12/1976 | Quick | 126/270 |
| 4,000,850 | 1/1977 | Diggs | 237/1 A |
| 4,003,366 | 1/1977 | Lightfoot | 237/1 A |
| 4,010,733 | 3/1977 | Moore | 126/271 |
| 4,029,080 | 6/1977 | Warren | 126/271 |

*Primary Examiner*—James C. Yeung

[57] ABSTRACT

Panels are formed and mounted in an exterior structure covering assemblage exteriorly simulating a standard exterior structure covering panel assemblage while simultaneously providing a fluid flow network within the panel assemblage for solar heat collection while not substantially disturbing the standard panel assemblage simulation. Generally, the panels have a relatively thin, freely heat transferring exterior layer portion with directly underlying fluid flow channels interconnected between panels for the overall assemblage fluid flow network without substantially disturbing the exterior standard panel simulation. The panels may be formed to simulate any standard roofing or siding panels and the solar heat collecting assemblage may be integrated with adjacent panel assemblages not including the solar heat collecting features with the overall assemblage still maintaining the same standard panel simulation.

26 Claims, 17 Drawing Figures

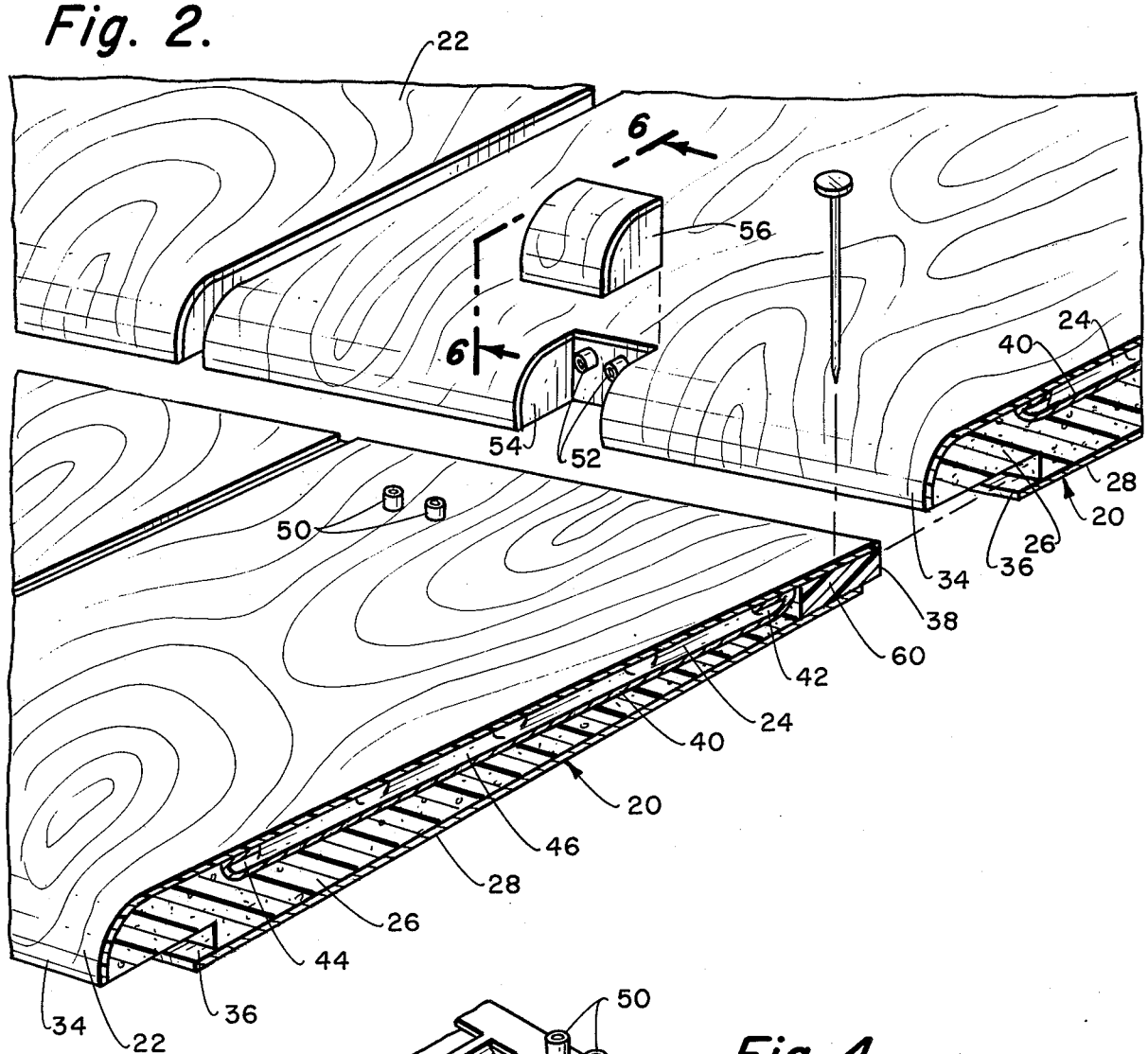
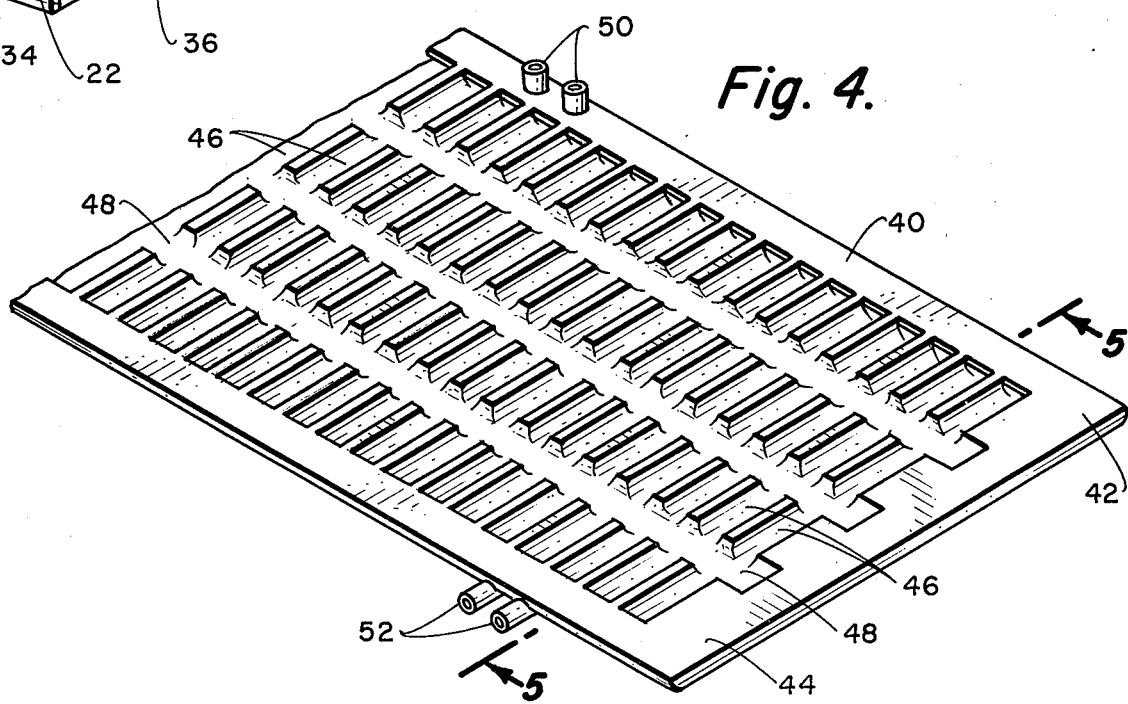

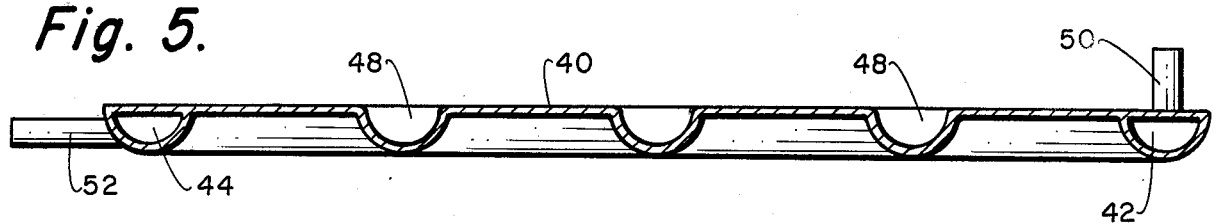
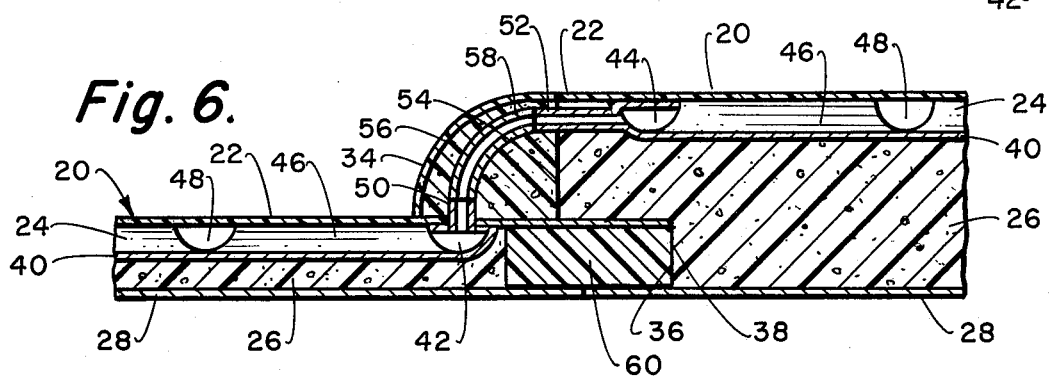
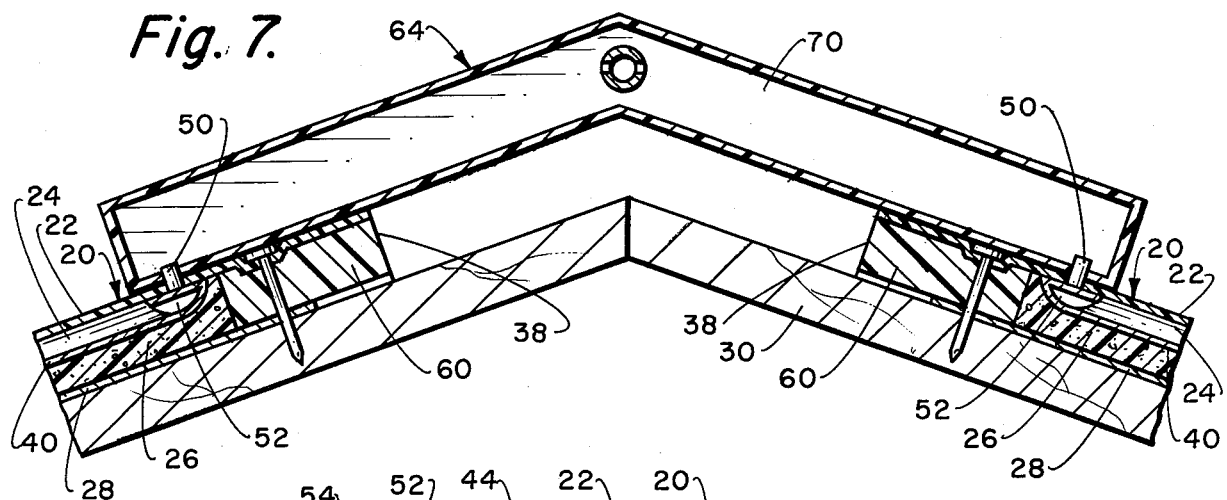
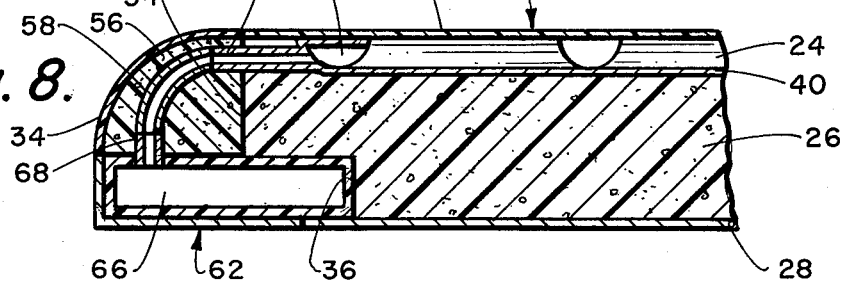
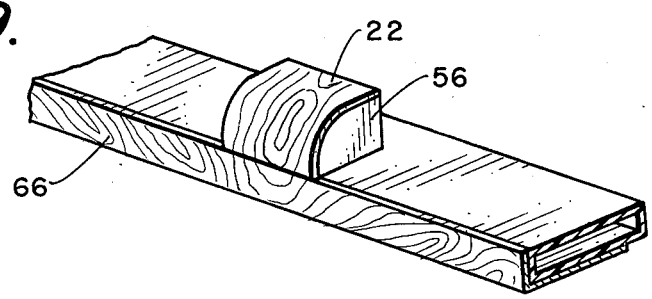

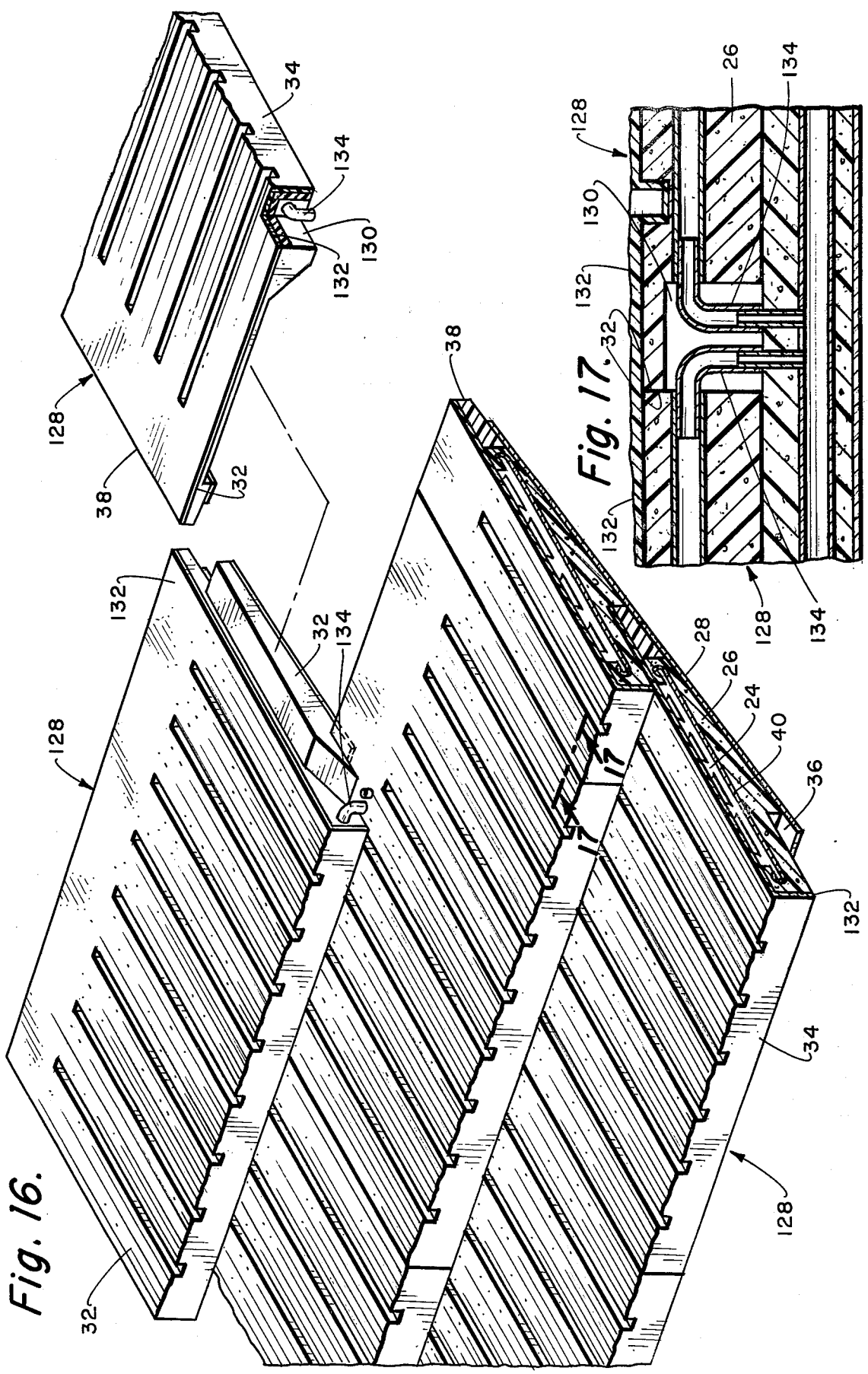

SOLAR HEAT COLLECTING PANEL ASSEMBLY AND METHOD FOR COVERING STRUCTURES

BACKGROUND OF THE INVENTION

This invention relates to the construction and formation of solar heat collecting panels and assemblages thereof which combine two basic concepts, the concept of exteriorly covering structures with panel assemblages which exteriorly simulate standard panels, such as standard roofing and siding, and combined therewith the concept of providing means mounted at a structure exterior capable of solar heat collection for use in a conventional solar heating system of the structure. According to the principles of the present invention, these two normal covering and solar heat collection concepts are uniquely combined without substantially disturbing the standard panel simulation so that the final overall exterior appearance is that of standard roofing or siding. Thus, efficient exterior structure covering is accomplished serving the required exterior covering purposes and a solar heat collecting network is also provided at a relatively nominal additional cost, all while preserving a standard panel exterior simulation with virtually no visible exterior indication that the solar heat collecting network has been so incorporated.

Various prior forms of exterior structure covering panels simulating standard panels have heretofore been available. For instance, such panels may be formed to simulate standard roofing such as wood shingles or shakes, asphalt composition shingles, ceramic tile and slate, or standard siding such as wood or metal siding. Furthermore, the panels may be mounted for their exterior covering purposes generally in conventional manner as would be standard roofing or siding, that is, edge interlocked or edge interlocked with simulated downward overlapping in the case of either the roofing or siding.

One very important advantage of these simulated exterior covering panels is that efficient thermal insulation may be integrated into the interior structure thereof providing thermal insulation for the structure far greater than that of standard exterior covering panels. Also, the unit weight of the simulated panels may be far less than that of comparable standard panels reducing the load supporting requirements of the structure being covered, as well as decreasing handling weights for workmen installing the same. In the case of exterior structure coverings that in actual form can only be provided in small units such as shakes, ceramic tile and slate, the simulated panels may be provided in relatively large multiple unit assemblies, the size thereof usually only being limited by that which can be conveniently handled by a workman during installation.

Generally in the case of solar heat collecting panels adapted for exterior mounting on various structures, such panels have previously been very particularly formed based on specific solar heat collecting principles and for the same reasons, very particularly mounted. As thusly constructed, the prior solar heat collecting panels, although they have been relatively efficient for serving their intended purpose, have been quite expensive to provide adding markedly to the overall structure cost, have further been quite unique in exterior appearance not even remotely resembling the standard exterior structure covering and have not nor have they been intended to serve any exterior structure covering purpose. The overall result, therefore, has been that the prior solar heat collecting panel installations for structures have appreciably added to the overall structure cost and have been quite unsightly and readily visually distinguishable due to the installed appearance thereof.

OBJECTS AND SUMMARY OF THE INVENTION

It is, therefore, an important object of this invention to provide an exterior structure covering panel construction and assemblages thereof serving a unique dual purpose, that of providing efficient exterior structure covering in assembled panel form simulating somewhat conventional exterior structure coverings, such as roofing and siding, and at the same time, without disturbing the standard roofing and siding simulation, providing a solar heat collecting network hidden within the panels for use in a solar heating system of the particular structure. Once installation of the structure covering panel assembly is complete, the exterior appearance thereof is substantially the same as would be obtained by use of conventional exterior structure covering panels and the integration therein of the solar heat collecting network is virtually indistinguishable to the exterior visual observer. Thus, the valuable dual benefits are obtained, all in a single installation and at only a nominal additional cost, far less than has been required for prior separate structure coverings having solar heat collecting panels mounted thereon.

It is a further object of this invention to provide an exterior structure covering panel construction and assemblages thereof of the foregoing general character which, despite the incorporation of the solar heat collecting network therein, may be formed to simulate virtually any form of standard exterior structure coverings. For instance, the panels may simulate roofing of wood shingles or shakes, asphalt composition shingles, ceramic tile and slate, and siding of various forms such as wood or metal siding. Furthermore, the panels may be of the form which interlock during assembly and may further have assembled outside appearance of downwardly overlapped panels, thereby retaining all of the exterior aesthetics of standard exterior covering panels or prior simulated standard exterior covering panels.

It is still a further object of this invention to provide an exterior structure covering panel and assemblages thereof which, again, despite the incorporation therein of the advantageous solar heat collecting network, may be formed to include all of the advantages of the prior simulated exterior structure covering panels over the standard structure coverings. The basic requirements for the solar heat collecting network are that such network be positioned directly underlying the exterior face layer portions of the panels in order to efficiently accomplish the solar heat collection purposes, even though still hidden from exterior view. Otherwise, the panels may include all of the interior structure of the prior simulated panels such as thermal insulation, various forms of weather and fire protection, reduced weight over the materials being simulated, and the incorporation of multiple units of standard coverings in a single panel.

It is a still further object of this invention to provide an exterior structure covering panel construction and assemblages thereof which, in preferred form, may satisfy the foregoing objects, yet may be installed using virtually standard installation procedures with only minor additions of a quite simple nature. Basically, the panels are positioned and secured by conventional procedures just as have been the prior simulated panels, the only additional assembly steps being those required for completing connection of the solar heat collecting network between adjacent panels of the final assembly. In certain forms of the panel construction, special tubular connectors are used between adjacent panel edges for completing the solar heat collecting network, where in other forms of the panel construction, such connections are accomplished merely by usual assembly of the panels. In any case, however, the additional assembly requirements are of quite simplistic form capable of accomplishment without special skills.

Other objects and advantages of the invention will be apparent from the following specification and the accompanying drawings which are for the purpose of illustration only.

BRIEF DESCRIPTION OF THE DRAWINGS

FIG. 2 is an enlarged, fragmentary, exploded perspective view, part in vertical section, illustrating the internal structure and assembly of the panel construction of FIG. 1;

FIG. 4 is an enlarged, fragmentary perspective view of the tray of FIG. 3 separate from the panel of FIG. 3;

FIG. 5 is an enlarged, vertical sectional view looking in the direction of the arrows 5—5 in FIG. 4;

FIG. 6 is an enlarged, fragmentary, vertical sectional view looking in the direction of the arrows 6—6 in FIG. 2, but with the panels of FIG. 2 in assembled form;

FIG. 7 is an enlarged, fragmentary, vertical sectional view looking in the direction of the arrows 7—7 in FIG. 1;

FIG. 8 is an enlarged, fragmentary, vertical sectional view looking in the direction of the arrows 8—8 in FIG. 1;

FIG. 9 is a reduced, fragmentary perspective view of a main assemblage header and connector removed from the assembly of FIG. 8;

FIG. 16 is a partially exploded perspective view with parts in vertical section of an assemblage of a fourth preferred embodiment of the exterior structure covering panel construction of the present invention; and FIG. 17 is an enlarged, fragmentary, vertical sectional view looking in the direction of the arrows 17—17 in FIG. 16.

DESCRIPTION OF THE BEST EMBODIMENTS CONTEMPLATED

Figure 1:
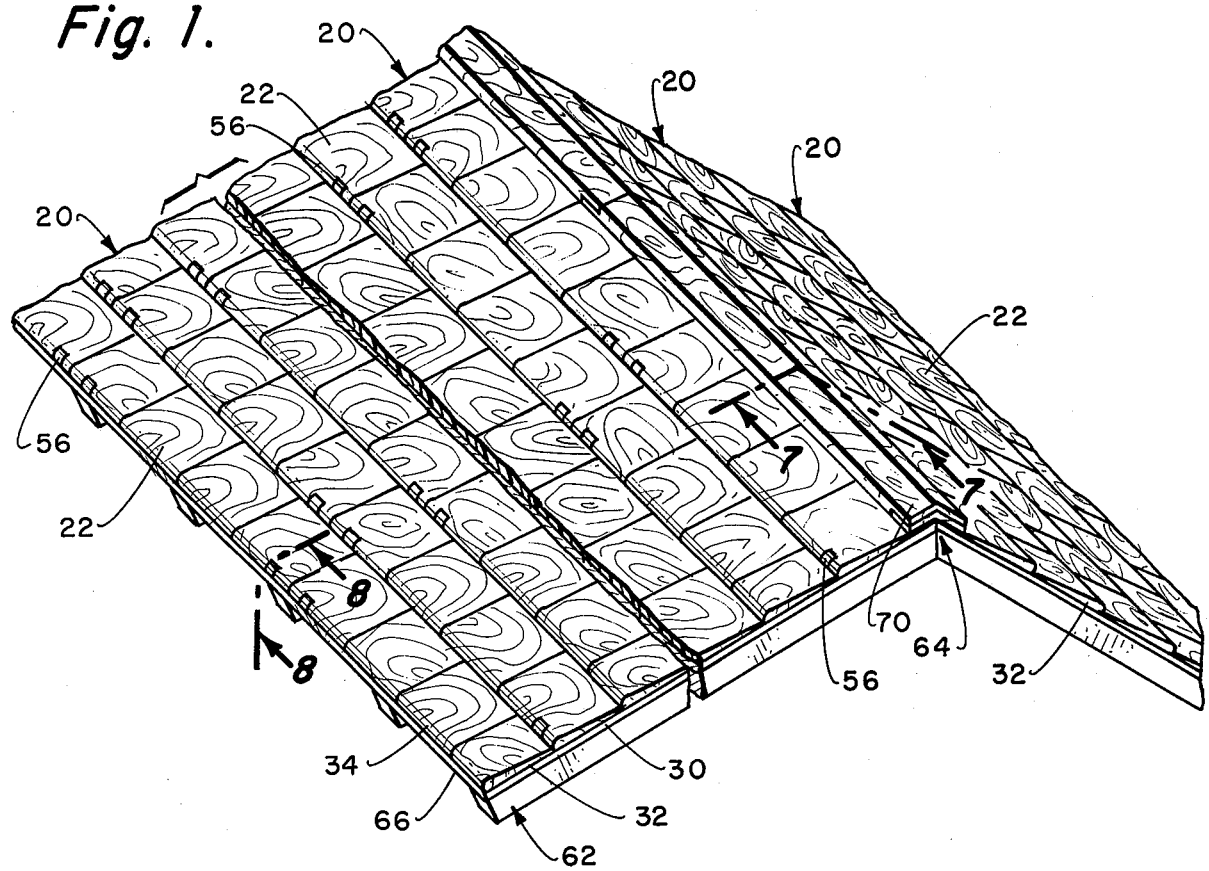
FIG. 1 is a fragmentary, perspective view of a structure roof exteriorly covered by an assemblage of a first preferred embodiment of the exterior structure covering panel construction of the present invention.

Referring to FIGS. 1 through 9 of the drawings, a first preferred embodiment of the exterior structure covering panel construction is shown in an assemblage particularly adapted for serving as an exterior roofing material directly replacing the normal use of standard roofing materials. As shown, individual modular panels generally indicated at 20 each include an exterior face layer portion 22, a directly interiorly underlying fluid circulating channel portion 24, an insulation portion 26 interiorly underlying the fluid circulating channel portion, and an interior mounting surface portion 28 adapting the panel for direct mounting on the usual structure sub-roofing 30 (FIGS. 1 and 7). Furthermore, each of the panels 20 is formed to exteriorly simulate standard roofing materials, in this particular case, each panel simulating five standard wood shingles which are downwardly overlapping in the overall assembly. Side edge portions 32 of the panels 20 are preferably formed adapted for side interlocking and abutting in somewhat usual manner in the assemblage, and normally positioned lower edge portions 34 are formed with edge opening mounting grooves 36 extending totally between the side edge portions adapted for receiving upper edge portions 38 of adjacent panels therein in the assemblage, all to be hereinafter explained more in detail.

More particularly to the specific structure of each of the panels 20, the exterior face layer portion 22 is preferably formed of multiple plastic layers, a surface layer having good ultraviolet and weathering resistance, such as acrylic or fluorocarbon-based plastic or similar plastics, and such face layer also preferably includes coloration and fire retardants. A second layer of fiberglass-filled polyester or other rigid plastic material to provide structural strength to the exterior face layer portion 22 may underlie the face layer. Particularly, the overall exterior face layer portion 22 must be relatively thin and if so, the multiple plastic layers will have reasonable heat transfer characteristics, for instance, the overall exterior face layer portion should be in the order of 30 thousandths thickness, although somewhat larger values may be acceptable and particularly if glazings or other surface optical property enhancements are employed. Keeping in mind the heat transfer qualities desired and the particular standard roofing to be simulated such as, in the present embodiment, the wood shingles, or in other cases shakes, asphalt composition shingles, ceramic tile, slate or some other standard roofing, the exterior face layer portion 22 will provide better performance through coloration of one or all of the multiple layers thereof with one of the darker reds, browns, greys, or greens, the lighter colors retarding the heat transfer qualities.

The fluid circulating channel portion 24 of the panels 20 are preferably basically formed by premolded rigid plastic trays 40 providing fluid circulating networks throughout the major portions of the panels directly underlying the exterior face layer portions 22 and preferably opening directly against the exterior face layer portion. As can be seen, for instance, in FIGS. 3, 4 and 5, each of the trays 40 includes upper and lower tubular header portions 42 and 44 extending along the tray upper and lower edges which are connected in fluid flow communication with a multiplicity of fluid circulating channels 46 primarily extending between the panel upper and lower edge portions 38 and 34. For overall uniform fluid circulation throughout each of the panels 20, the fluid circulating channels 46 are side connected at spaced locations therealong by bridging channels 48 throughout the tray 40 completely between the panel side edge portions 32. Each of the trays 40 is positioned in its panel 20 extending between the edge extremities of the panel side edge portions 32 with the tray fluid circulating channels 46 being formed closed off at these side edge portions, and the tray upper and lower extremities formed by the upper and lower header portions 42 and 44 are spaced edgewise inwardly from the panel edge extremities at the panel upper and lower edge portions 38 and 34.

Figure 3:
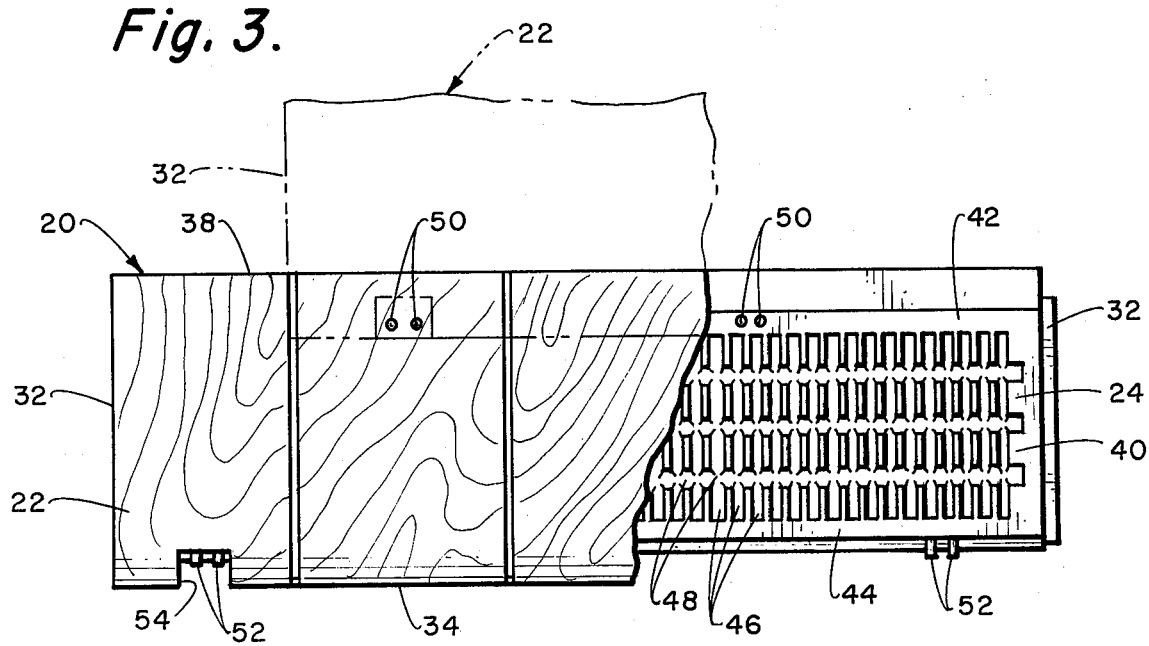
FIG. 3 is an enlarged top plan view of one of the panels of the assemblage of FIG. 1 with an exterior face layer portion thereof partially removed to show a top plan view of an internal tray forming a solar heat collecting network therein.

To complete the fluid circulating network for each of the panels 20, side spaced pairs of vertical fluid connector tubes 50 are mounted in fluid flow communication with the tray upper header portion 42 and projecting spaced upwardly through and from the panel upper edge portion 38. Similar side spaced pairs of horizontal fluid connector tubes 52 are positioned in fluid flow communication with the tray lower header portion 44 projecting a determined distance into connector block cutouts 54 at the panel lower edge portion 34. Appropriately, form fitting shape connector blocks 56 are received in the connector block cutouts 54 during panel assemblage and are adapted through fluid connector tubes 58 therein for fluid flow connecting the panel horizontal fluid connector tubes 52 with the vertical fluid connector tubes 50 of a downwardly adjacent panel 20 of the assemblage, for instance, as shown in FIGS. 1, 2 and 6. It will be noted that the particular locations of the various sets of fluid connector tubes 50 and 52 in the panels 20 is specifically determined so that the fluid circulating networks of the individual panels may be connected and form an overall assemblage fluid circulating network when the panels are positioned in the assemblage offset one to the next a uniform determined amount as illustrated in FIG. 3, the general edge outline of the next above of the panels being indicated in phantom lines.

The insulation portion 26 of each of the panels 20 is formed by filling the remainder of the panel directly underlying the tray 40 and otherwise totally between the exterior face layer portion 22 and the interior mounting surface portion 28, except for a part of the panel upper edge portion 38, with a structurally rigid and thermal insulating foamed plastic, such as a rigid foamed polyurethane. As shown in FIG. 2, in order to provide the panel lower edge overlapping simulation, the edge opening mounting groove 36 at the panel lower edge portion 34 is formed directly adjacent the interior mounting surface portion 28 occupying only a part of the thickness of the panel due to the tapered increasing thickness thereof from the upper edge portion 38 down to the lower edge portion 34 and the edge opening mounting groove is bordered at two sides by the insulation portion foamed plastic with the exterior face layer portion 22 curving at the panel lower edge extremity to the mounting groove. As can also be seen in FIG. 2, as well as in FIG. 6, at the panel connector block cutouts 54, the connector blocks 56 are similarly formed with the fluid connector tubes 58 therein being embedded directly in the insulation portion foamed plastic spaced interiorly of the part of the exterior face layer portion 22 of the connector blocks.

The panel interior mounting surface portion 28 of each of the panels 20 is preferably formed by a rigid sheet of any of the usual building materials such as masonite, plywood or any of the usual composition building materials, and the sheet is positioned projecting outwardly from the insulation portion 26 at the panel lower edge portion 34 to complete the edge opening mounting groove 36 and interiorly define such groove. Each of the panels 20 is completed by a rigid nailing block 60 at the panel upper edge portion 38 preferably formed of plastic or wood. The nailing block 60 directly underlies the extremities of the exterior face layer portion 22 at the panel upper edge portion 38 and is interiorly overlapped by the rigid sheet forming the interior mounting surface portion 28. As can be seen in both FIGS. 2 and 6, the dimensions of the combined exterior face layer portion 22 and the nailing block 60 are such that this part of the panel upper edge portion 38 fits slideably into the panel edge opening mounting groove 36 of an upwardly adjacent panel 20 during the assemblage thereof to be hereinafter described.

In formation of the roof assemblage of FIG. 1 using a multiplicity of the described modular panels 20, the panels are mounted over the structure sub-roofing 30 in somewhat usual manner similar to the mounting of standard roof materials. Starting at the lowermost row of the panels at the roof eaves generally indicated at 62, the panels 20 are positioned side interlocked and retained in place by appropriate nailing through the portion of the nailing blocks 60 more closely adjacent the fluid circulating channel portions 24, that is, the nailing block portion which is overlapped by the edge of the sheet forming the interior mounting surface portion 28. At this time, the panel connector blocks 56 will not yet have been mounted in the connector block cutouts 54 and the continuously side aligned edge opening mounting grooves 36 of this first lowermost row of panels will remain temporarily open.

The next upwardly adjacent row of panels 20 is then assembled with the first lowermost row engaging each of the next row of panels downwardly with the upper edge portions 38 of the lowermost row received in the edge opening mounting grooves 36 of the next upwardly adjacent row, thereby not only side interlocking the rows of panels, but also interlocking each row to the next. During positioning of this next upper row of the panels 20 and the subsequent rows thereof, the panels of each row are properly side offset, one row to the next so as to align the connector block cutouts 54 and the horizontal fluid connector tubes 52 thereof at the panel lower edge portions 34 with the sets of vertical fluid connector tubes 50 at the panel upper edge portions 38 preparatory to final proper completion of the fluid circulating network throughout the panel assemblage. Each of the panels 20 is retained in place by nailing through the panel nailing blocks 60 as previously described and usual weatherproof glues can be incorporated in such assembly in the usual manner if desired.

Following the same procedures, the roofing assemblage may be completed up to the roof ridge generally indicated at 64 in FIG. 1. Furthermore, during the positioning and interlocking of the panels 20 in the formation of the overall assemblage, panels 20 of reduced side-to-side dimensions will be required to be used. These can either be supplied as reduced width panels specifically formed for that purpose or the full width panels may be cut to size in usual manner in view of the internal structure thereof with the cut side edge portions being preferably covered for both exterior appearance and particularly edge fluid sealing of the panel fluid circulating channel portions 24.

To complete the overall roofing assemblage and, most importantly, at the same time completing the overall assemblage fluid circulating network, assemblage main lower headers 66 are assembled in the edge opening mounting groove 36 of the lowermost rows of the panels 20 at the roof eaves 62 in the manner shown in FIGS. 1 and 8, sets of vertical fluid connector tubes 68 of the assemblage main lower headers being aligned with the connector block cutouts 54 and the cutout horizontal fluid connector tubes 52 of the panels. In the same manner, an assemblage main upper header 70 is mounted over the upper edge portions 38 of the two uppermost rows of the panels 20 at the roof ridge 64, simulating a standard ridge strip assembly and receiving the vertical fluid connector tubes 50 at the panel upper edge portions 38 fluid communicating upwardly therethrough into the interior thereof. These assemblage main lower headers 66 at the roof eaves 62 and assemblage main upper headers 70 at the roof ridge 64 being headers, are continuously hollow and may serve for main fluid distribution with any desired group of panels 20 of the assemblage depending on the fluid distribution desired. Also, similar to the panels 20, these assemblage main headers 66 and 70 may be formed in modular lengths, appropriately joined for continuous fluid circulation and cut to length with subsequent end covering and sealing just as with the panels 20.

The last assembly step to complete the dual purpose overall assemblage is the mounting of the connector blocks 56 in each of the connector block cutouts 54 to simultaneously fluid flow connect the lowermost rows of the panels 20 with the assemblage main lower headers 66 as illustrated in FIGS. 8 and 9, and panel-to-panel as illustrated in FIGS. 2 and 6. The final overall assemblage is shown in FIG. 1 with the overall assemblage fluid network complete, yet virtually hidden from view just as if not present. At the same time, the overall assemblage in exterior appearance closely simulates standard wood shingles normally used for roof coverings, despite the simulated panel advantages of the direct incorporation of thermal insulation therein and the ease of installation due to the weight reductions, uniformity and appropriate interlocks.

Figure 15:
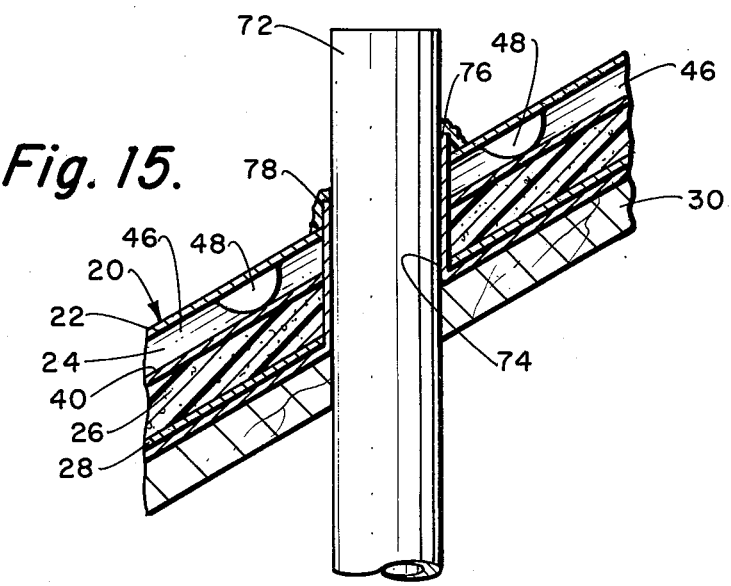
FIG. 15 is an enlarged fragmentary, vertical sectional view looking in the direction of the arrows 15—15 in FIG. 14.
Figure 14:
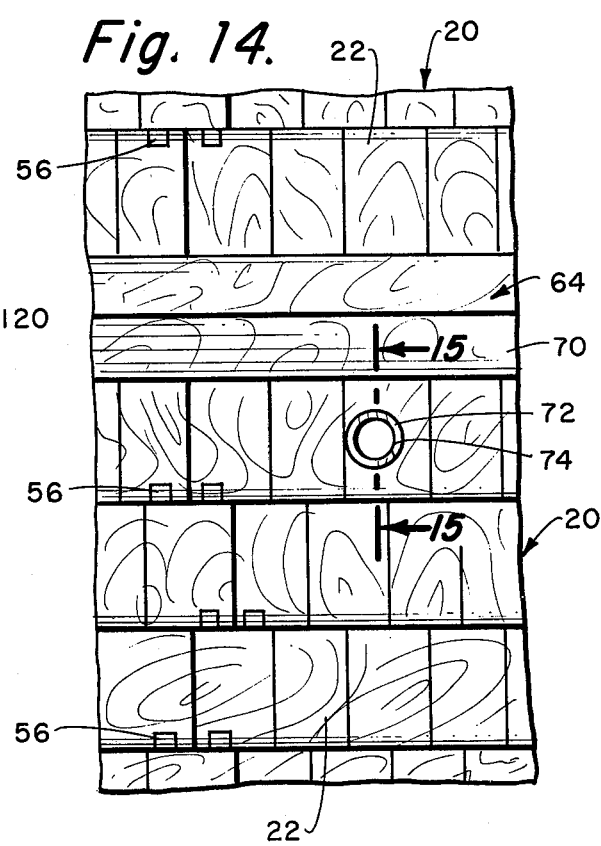
FIG. 14 is a fragmentary, top plan view of a portion of the roof of FIG. 1 having a usual structure vent pipe extending upwardly therethrough.

To further illustrate the versatility of this first embodiment panel construction of the present invention, FIGS. 14 and 15 show the panels 20 in a roofing assemblage such as that of FIG. 1 wherein a structure vent pipe 72 extends vertically up through the panel assemblage. The simple steps of providing for the structure vent pipe 72 are the cutting of an appropriate circular opening 74 through the particular panel 20 and the securement, for instance by gluing, of a tubular sleeve 76 in the panel opening to seal off the exposed surfaces of the panel and particularly seal off the fluid circulating channel portion 24 against the leakage of fluid therefrom. The panel 20 is then positioned telescoping the vent pipe 72 and usual sealing compound 78 is exteriorly applied as would be the case in standard roofing.

As hereinbefore pointed out, the prime broad novelty of the exterior structure covering panel construction and assemblages thereof is that dual purposes are uniquely served, the exterior appearance simulation of standard structure exterior coverings with many advantages thereover and combined therewith, the provision of a solar heat collecting fluid circulating network without disturbing the exterior appearance of the assemblages. As to the solar heat collecting fluid circulating network, the general purpose of solar heat collection may be obviously accomplished by either liquid or gaseous fluids, that is, a liquid such as water or a gas such as air, although it is conceivable that other liquids or gases could be advantageously used and it is not intended to limit the principles of the present invention in such respect. Furthermore, when the term "solar heat collection" is used, it should be kept in mind that a solar heat collecting network can be easily integrated by provision of the separate well-known equipment into a combined solar heat collecting and heat disposal or dissipation system such as structure solar heating during daylight and structure heat removal or cooling during nighttime. Thus, in the discussion herein of circulating fluids for solar heat collection, it is intended to mean such alternate heat dissipation uses, the one merely being the opposite of the other from the broader standpoint.

It is pointed out that there is one critical area of construction which can be effected by the foregoing choice of solar heat collection alone for the alternate use of the same installation for daytime solar heat collection and nighttime cooling, and that is the exterior surface finish of the panels, for instance, the exterior finish of the exterior face layer portion 22 of the panels 20 hereinbefore described. If the particular panel assemblage is to be used solely for solar heat collection, such solar heat collection may be enhanced by the application of various surface glazings to the panels as well as other known materials for similar purposes, but still without appreciably disturbing the panel exterior appearance in the standard panel simulation. If, however, both daytime solar heat collection and nighttime cooling are to be incorporated in the overall structure system, most of the solar heat collection enhancements may not be used in view of the fact that although solar heat collection during daytime will be increased, heat dissipation during nighttime will be greatly retarded.

In any event, the first embodiment of the exterior structure covering panel construction and assemblage as hereinbefore described is particularly adapted for use of a heat transfer medium preferably in liquid form such as water, and for this reason, the fluid circulating channel portions 24 of the panels 20 should be sealed watertight. Specifically, the trays 40 should be sealed by waterproof glue to the exterior face layer portions 22 to prevent water leakage internally into the panels 20, although many of the foam plastics which may comprise the insulation portions 26 are relatively water resistant. The same attention should be applied to the fluid or water flow interconnection between the various panels 20 and to and/or from the assemblage main lower headers 66 at the roof eaves 62 and the assemblage main upper header 70 at the roof ridge 64.

However, one distinct and novel advantage of the formation of the panels 20 and the formation of the overall panel assemblage is that any water leaks that do occur at the interconnections between adjacent panels and between panels and main headers, the locations most susceptible to such leakage, will normally select flow paths to the exterior of the assemblage rather than internally into the structure. For instance, FIG. 6 shows the fluid flow interconnection between panels as previously described and keeping in mind that the panels in the final assemblage slope downwardly, any water leakage at the connector blocks 56 will ultimately flow generally downwardly along the panel exterior surfaces of the exterior face layer portion 22 and not internally of the assemblage into the structure. The same is true between the assemblage main upper header 70 at the roof ridge 64 as shown in FIG. 7. At the assemblage main lower headers 66 at the roof eaves 62, still keeping in mind the downward slope projection, will normally be along the upper surfaces of the headers 66 and outwardly of the structure eaves.

A still further practical advantage of the first embodiment panels 20 and the assemblage thereof which is particularly necessary where the panels of the present invention are applied to roof assemblages is the fact that each of the panels is constructed relatively load bearing, that is, capable of supporting at least the weight of a workman standing thereon or walking across the same, clearly advantageous for original installation and necessary for periodic roof inspections and/or repair. As described, at least one of the layers of the panel exterior face layer portions 22 may be of fiberglass reinforced plastic so as to provide structural strength in spanning the fluid circulating channels 46 and bridging channels 48 of the fluid circulating channel portion 24. Also, with the combination of the rigid trays 40, the rigid foam insulation portions 26 and the sheet interior mounting surface portions 28, load bearing divider sections are formed, in effect, forming the various fluid channels, while still spanning interiorly totally between the exterior face layer portion 22 and the interior panel mounting surface against the structure sub-roofing 30 to provide the necessary load bearing support.

The fluid or water circulation in the roof assemblage of FIG. 1 will most advantageously in most cases be from the assemblage main upper header 70 at the roof ridge 64 downwardly to the assemblage main lower headers 66 at the roof eaves 62 with such water flow being appropriately regulated for the most advantageous solar heat collection and possibly heat dissipation by the particular formation of the panel fluid flow channels, the fluid flow interconnections therebetween and the fluid flow interconnections with the assemblage main headers. Between the roof assemblage of FIG. 1 and the interior of the structure, the water will flow through the remainder of the typical solar heat collection system where the heat collected by the water may be advantageously used, or alternately through a structure cooling system if heat dissipation for structure cooling is also incorporated. Dependent on the amount of solar heat desired and possibly the cooling desired, all of which will be dependent on the climatic conditions where the structure is located and the degree of total heating or cooling to be incorporated in the structure design, any portion or all of the particular structure roofing may be formed by the dual purpose solar heat collecting panels 20, and if only a portion of the structure roofing is used, the remainder of the roofing may be supplied by panels constructed and installed virtually identically to the panels 20 with the exception that these panels would not include the fluid circulating channel portions 24, although they would appear identical in exterior appearance.

Figure 10:
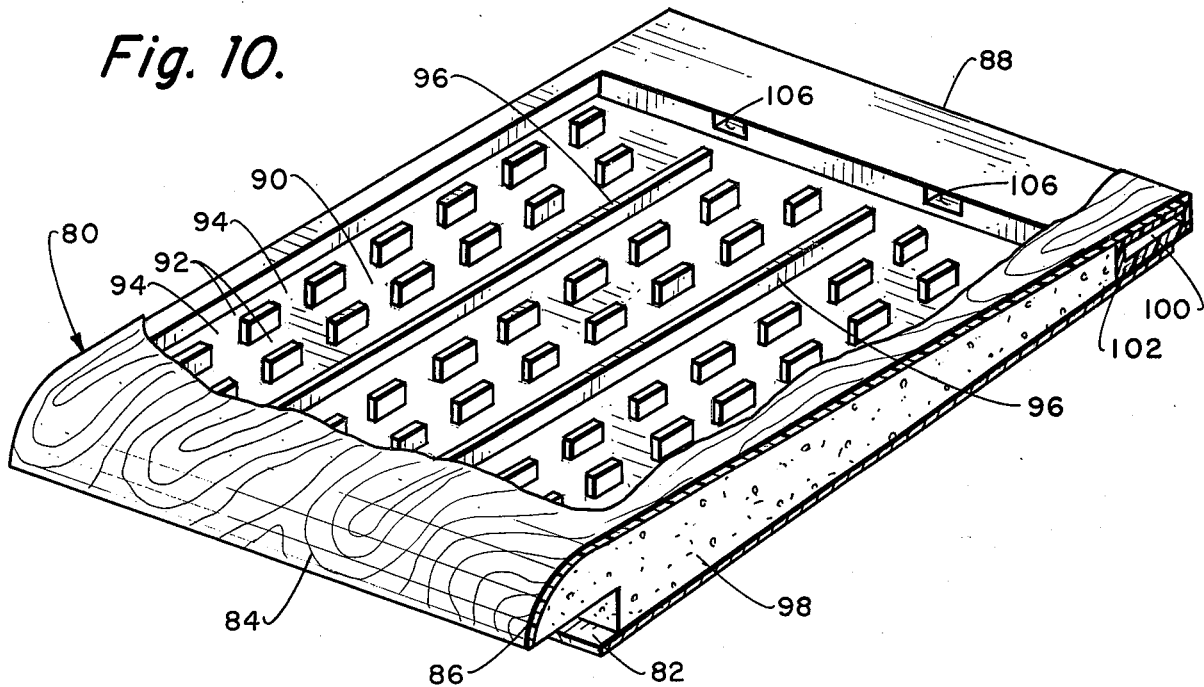
FIG. 10 is a perspective vertical sectional view of a second preferred embodiment of the exterior structure covering panel construction of the present invention with an exterior face layer portion thereof broken away to show the construction of the solar heat collecting network thereof.
Figure 11:
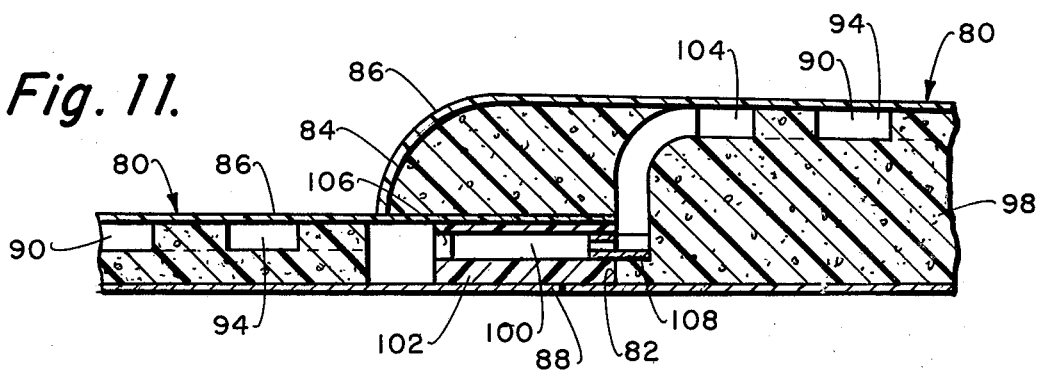
FIG. 11 is an enlarged, fragmentary, vertical sectional view through an assemblage of two of the panels of FIG. 10.

A second embodiment of the dual purpose panel principles of the present invention is shown in FIGS. 10 and 11, in this case, directed primarily toward a panel and assemblages thereof where a gaseous fluid, such as air, is the heat exchange medium circulated for solar heat collection and possibly structure cooling. As shown, panels generally indicated at 80 are quite similar in exterior appearance to the first embodiment panels hereinbefore described having the same general contour including the same edge opening mounting grooves 82 in the lower edge portions 84 and having the same exterior face layer portions 86 extending from an upper edge portion 88 to the lower edge portion curving smoothly to the mounting groove. As before, the exterior panel simulation of standard roofing materials may be the same and in a roof covering assemblage, the panels will appear as downwardly overlapping panels. The principal differences are in a fluid circulating channel portion 90 thereof which again necessarily directly underlies the panel exterior face layer portion 86.

Since circulating air is the heat exchange medium involved, various fluid circulating channels 92 and bridging channels 94, as well as intermediate separators 96, may be formed in or of the same foam plastic as an underlying insulation portion 98. In other words, since only exterior atmospheric moistures need be guarded against and there will be no danger of moisture absorbence from internal liquid flow as in the first embodiment, substantially the entire of the fluid circulating channel portion 90 of this second embodiment may be formed directly in and from the foam insulation portion 98. As shown, a panel upper header portion 100 may be formed directly in a nailing block 102 at the panel upper edge portion 88 and a panel lower header portion 104 may be formed directly in the insulation portion 98 air flow communicating into the edge opening mounting groove 82 through appropriate connector channels 106 and connector tubes 108. Thus, in the assemblage of the panels 80, the edge opening mounting groove 82 at the lower edge portion 84 of an upper panel receives the upper edge portion 88 of a lower adjacent panel interengaged therein not only completing the roofing assemblage for simulation of downwardly overlapped roofing, but also completing the fluid flow communication between the various panels integrating the fluid circulating channel portions 90 thereof into the overall assemblage fluid circulating network.

In the overall roofing assemblage of the second embodiment panels 80, with air or some other appropriate gas serving as the heat exchange medium for circulation through the fluid circulating network of the assemblage, the flow direction in most instances will be most advantageously opposite that where heat exchange liquids are involved. With air, as would be true of most other appropriate gases, the flow direction would be from lower to upper in order to take advantage of convection for gas distribution and flow purposes. The overall roofing assemblage with the second embodiment panels 80 would, of course, be air flow connected with appropriate solar heat collection and/or cooling equipment otherwise associated with the particular structure to complete the overall systems.

With the described first and second embodiments of the dual purpose panel principles of the present invention, therefore, the versatility thereof can be readily seen, that is, with relatively simple alterations, the panel constructions and the assemblages thereof can be readily adapted to the use of virtually any heat exchange medium, particularly available at the structure involved. It is pointed out that in describing both of the first and second embodiments of the present invention, both have been referred to as structure roofing assemblages, but both embodiments could be equally advantageously used as structure siding assemblages. Depending on the standard exterior structure coverings being simulated, downwardly overlapped siding is frequently used for structures so that virtually the same panel constructions could be assembled providing not only the unique siding simulation with all of the advantages of simulated panels, but the same fluid circulating network throughout the simulated siding or any portion thereof similar to that hereinbefore discussed.

Figure 12:
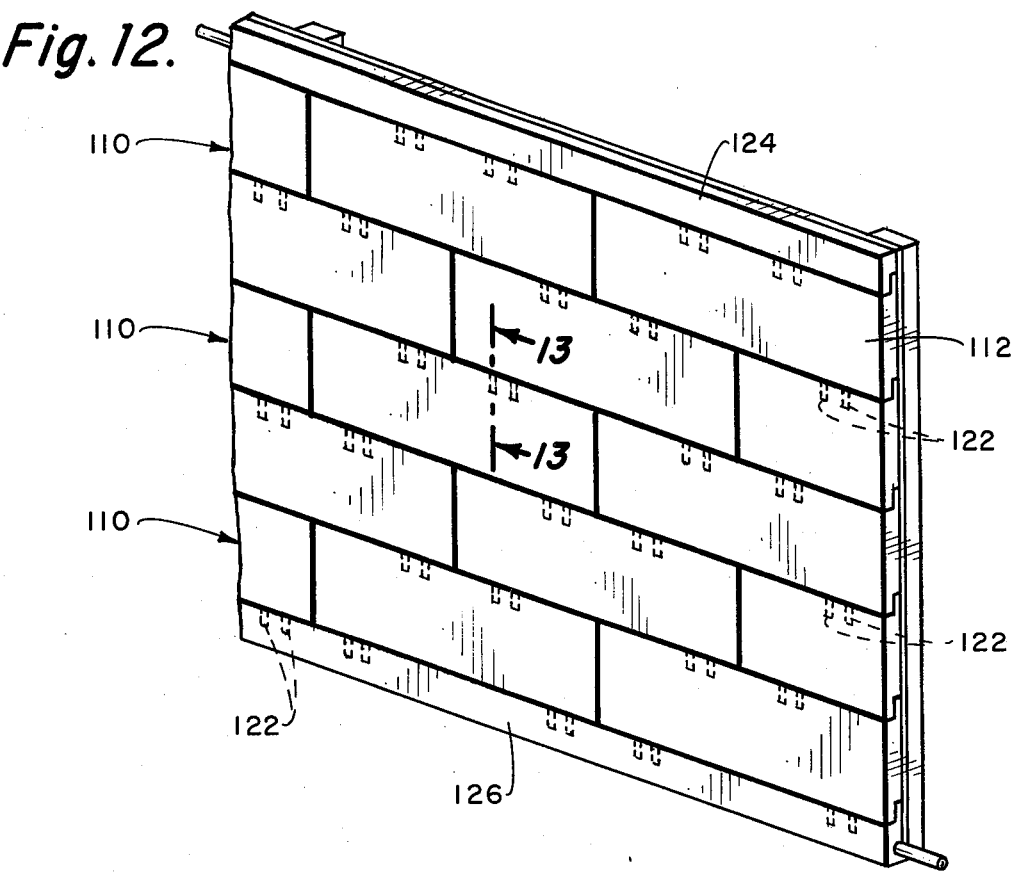
FIG. 12 is a fragmentary, perspective view of an assemblage of a third preferred embodiment of the exterior structure covering panel construction of the present invention serving as structure siding.
Figure 13:
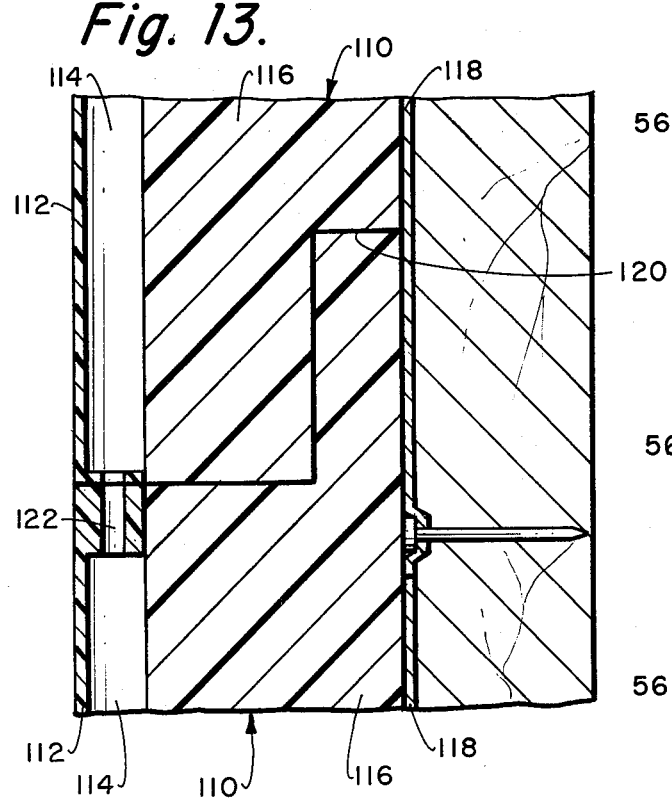
FIG. 13 is an enlarged, fragmentary, vertical sectional view looking in the direction of the arrows 13—13 in FIG. 12.

A third embodiment of the dual purpose panel principles of the present invention is shown in FIGS. 12 and 13 and in this case, the panel construction and assemblage thereof are particularly adapted for flush siding exterior structure covering use, although the basic principles involved are essentially the same as hereinbefore described. As shown, modular panels generally indicated at 110 are constructed quite similar to the previously described second embodiment panels particularly adapted for creating an assemblage overall fluid circulating network using a gaseous fluid such as air. Thus, without liquids involved internally thereof, each panel may include the same general type of exterior face layer portion 112, a directly interior underlying fluid circulating channel portion 114 formed directly in and from a further underlying plastic insulation portion 116 with the panel interior mounting surface being formed by a same interior mounting surface portion 118. A similar downward edge opening mounting groove 120 may be incorporated partially formed within the insulation portion 116 and by the lower edge part of the sheet forming the interior mounting surface portion 118.

As to the specific fluid circulating channel portion 114, the same may be formed as an internal rectangular chamber directly against the interior of the exterior face layer portion 112 with appropriate separators (not shown) to form the particular configuration of fluid channels desired. Since the panels 110 are simulating standard structure flush siding, the exterior face layer portions 112 in the overall assembly will edge abut so that the fluid circulating channel portions 114 of the individual panels may be directly vertically connected by appropriately placed connector channels 122. The overall panel assemblage may be completed by upper and lower main assemblage headers 124 and 126 which are, in turn, appropriately air flow connected into the heating and/or cooling equipment of the particular structure.

A fourth embodiment of the dual purpose panel principles of the present invention is shown in FIGS. 16 and 17 and the modular panels generally indicated at 128 are individually constructed and mounted in the assemblage substantially identical to the first embodiment panels with two exceptions. The first exception is that the first embodiment panels are constructed for simulating downwardly overlapped wood shingles, whereas these fourth embodiment panels 128 are constructed for simulating downwardly overlapping wood shakes. The second exception relates to the fluid flow interconnection between the fluid circulating networks of the individual panels 128 in the overall assemblage which will be described more in detail below.

As shown, a lower-side edge recess 130 is formed at each of the panel lower right-hand corners fully exteriorly covered in the panel overall assemblage by an exterior face layer portion 132. Angled connector tubes 134 fluid flow connect between the individual panel fluid circulating networks in the assemblage of the panels 128 to thereby complete the overall assemblage fluid flow network. Thus, completely exteriorly hidden fluid flow connections are established between the panels 128 in the assemblage enhancing the exterior panel simulation of the standard structure covering wood shakes.

According to the principles of the present invention, therefore, exterior structure covering panels are provided adaptable for virtually any form of structure exterior covering such as roofing and siding, and which serve unique dual purposes. The panels are formed for exteriorly simulating exterior covering assemblages of standard roofing and siding materials, for instance, wood shingles, wood shakes, asphalt composition shingles, ceramic tile, slate, various wood sidings, various metal sidings or any other form of standard exterior covering materials. Furthermore, the panels provide all of the unique advantages and more of the prior simulated exterior structure covering panels such as greater ease and efficiency of handling and installation over standard structure covering materials, complete interlocks between panels in final assemblage not always possible of accomplishment with standard structure covering materials and any degree of insulation effect desired capable of full incorporation therein if desired for normal heating and cooling energy conservation for the particular structure. Still further, and comprising the second unique purpose, the panels have directly incorporated therein solar heat collecting fluid circulating networks providing overall assemblage fluid circulating networks to any extent desired for solar heat collection and/or heat dissipation cooling for the structure without disturbing the standard structure covering material simulation so as to, in effect, serve this important unique further energy conserving purpose without having the same apparent to an observer from exteriorly of the particular structure.

As hereinbefore pointed out, from the standpoint of solar heat collection, the efficiency thereof served by the panels of the present invention and the assemblages thereof can be varied extensively dependent upon the particular materials chosen, the heat exchange medium being circulated through the panels, variations in surface preparation and the extent of structure covering to which the dual purpose panels are applied. If the panel assemblages are incorporated in a structure system or systems wherein the panels serve as solar heat collecting panels during the daylight hours and heat dissipation cooling panels during the nighttime hours, it is obvious that exterior panel glazings and other possible surface enhancements for solar heat collection alone may not be used and these would be some of the choices to be made in the original designs. Furthermore, although it is conceivable that in certain cases sheet metal could be substituted for the panel exterior face layer portions which must not only serve the purpose of exterior standard panel simulation but also the purpose of transferring heat for solar heat collection, it is well known that of the modern plastics presently available for forming the preferred exterior face layer portions of the panels, a certain amount of heat transfer efficiency must be sacrificed as compared to the prior, single purpose and quite expensive solar heat collecting panels.

Considering the state of modern technology and the various materials and manufacturing techniques presently available, it is presently contemplated that the solar heat collecting panel principles of the present invention will be most advantageously applicable to solar heat collecting systems where only a portion of the entire structure heating energy is to be supplied. For instance, with the prior sophisticated solar heat collecting panels of maximum efficiency, the cost versus percentage of structure heating requirements would dictate that in the order of a minimum of seventy percent of the entire structure heating requirements would be supplied by the solar heat collecting system, this of course varying dependent on climatic conditions of structure location. In other words, to provide a cost efficient solar heat collecting system with the prior sophisticated solar heat collecting panels with the energy cost savings recoverable over a reasonable period of years of the life of the structure, a very high percentage of the structure heating requirements must be served thereby and the cost for providing such a sophisticated solar heat collecting system is quite high in addition to the normal, presently fast rising, structure costs. Thus, in view of the expense thereof, the present sophisticated solar heat collecting panel systems are only available to a very small percentage of the population.

With the dual purpose exterior structure covering and solar heat collecting panels of the present invention, however, even though the lesser solar heat collecting efficiency thereof may dictate their serving to meet a much lower percentage of the particular structure heating requirements, the cost of providing the same is quite nominal, so that use thereof would be available to a very large segment of the population. As hereinbefore pointed out, the panels according to the present invention serve the unique dual purpose of exterior structure covering with aesthetically pleasing results while still incorporating the solar heat collecting results. Economies in both material costs and installation costs are provided over standard structure covering materials, this having nothing to do with the solar heat collecting benefit, and the additional solar heat collecting benefit added at a relatively nominal cost, all further adds to minimize the effect of the necessary equipment for completing this supplementary solar heat collecting system. If, in addition, heat dissipation for cooling is further incorporated in the particular system, even greater benefits at lower costs may be appreciated.

We claim:

1. In a simulated exterior structure covering panel adapted for solar heat collection; the combination: an exterior face layer portion of relatively thin non-transparent plastic material having reasonable heat absorption and transfer characteristics extending between panel normally positioned side, upper and lower edge portions, said face layer portion being exteriorly finished to simulate standard structure covering materials such as panels of standard roofing and siding including standard shingles, tile and the like; a multiplicity of divider sections extending interiorly from said face layer portion positioned defining a multiplicity of fluid circulating channels continuously between certain panel edge portions directly underlying said face layer portion and hidden from face layer exterior view by said face layer portion; interior means formed at interior side of said divider sections interiorly closing off said fluid circulating channels including an interior mounting surface adapting said panel for mounting against said structure exterior as a standard structure covering panel; fluid circulating connector means at certain of said edge portions for fluid flow connecting said fluid circulating channels to similar connector means and channels of similar adjacent panels when in a normal standard structure covering assemblage, said connector means being positioned for being substantially hidden from exterior view when in said fluid flow connecting functioning in said standard structure covering assemblage and in cooperation with said exterior face standard structure covering simulation while hiding said fluid circulating channels from exterior view giving panel appearance of a standard structure covering panel in a similar assemblage and without said channels; said simulated exterior structure covering panel incorporating its fluid circulating channels having structural strength at least substantially equivalent to the standard structure covering materials being simulated.

2. In a simulated exterior structure covering panel as defined in claim 1 in which said interior means formed at interior side of said divider sections includes thermal insulation material underlying said fluid circulating channels and extending substantially throughout said panel between said edge portions.

3. In a simulated exterior structure covering panel as defined in claim 1 in which said divider sections include a plastic member underlying said face layer portion and defining said fluid circulating channels directly underlying said face layer portion, said plastic member also forming a part of said interior means.

4. In a simulated exterior structure covering panel as defined in claim 1 in which said divider sections include a plastic tray member underlying said face layer portion defining said fluid circulating channels directly underlying and opening upwardly against said face layer portion, said plastic tray member also forming a part of said interior means.

5. In a simulated exterior structure covering panel as defined in claim 1 in which said interior means includes a foamed plastic underlying said fluid circulating channels substantially throughout said panel between said panel edge portions interiorly insulating said fluid circulating channels.

6. In a simulated exterior structure covering panel as defined in claim 1 in which said divider sections are load bearing divider sections and include a plastic tray member underlying said face layer portion defining said fluid circulating channels opening upwardly against said face layer portion; and in which said interior means includes a load bearing foamed plastic underlying said plastic tray member extending substantially throughout said panel between said panel edge portion interiorly insulating said fluid circulating channels.

7. In a simulated exterior structure covering panel as defined in claim 1 in which said panel lower edge portion has a lower edge opening mounting groove therein substantially along the extent thereof generally adjacent a lower edge of said interior mounting surface, said mounting groove being of a size complimentary to said panel upper edge portion and thereby being adapted for receiving an upper edge portion of a similar panel edgewise therein in a panel assemblage.

8. In a simulated exterior structure covering panel as defined in claim 1 in which said panel lower edge portion has a lower edge opening mounting groove therein substantially along the extent thereof generally adjacent a lower edge of said interior mounting surface, said mounting groove being of a size complimentary to said panel upper edge portion and thereby being adapted for receiving an upper edge portion of a similar panel edgewise therein in a panel assemblage, said panel progressively decreasing in thickness from said lower edge portion to said upper edge portion with said mounting groove occupying only a part of said panel thickness adjacent said interior mounting surface lower edge thereby adapting said panel for lower edge portion overlapping appearance in a panel assemblage with other similar panels.

9. In a simulated exterior structure covering panel as defined in claim 1 in which said panel lower edge portion has a lower edge opening mounting groove therein substantially along the extent thereof generally adjacent a lower edge of said interior mounting surface, said mounting groove being of a size complimentary to said panel upper edge portion and thereby being adapted for receiving an upper edge portion of a similar panel edgewise therein in a panel assemblage; and in which certain of said fluid circulating connector means are located at said panel lower edge portion and open into said mounting groove.

10. In a simulated exterior structure covering panel as defined in claim 1 in which said fluid circulating channels extend continuously between opposite of said panel edge portions hidden from exterior view by said face layer portion.

11. In a simulated exterior structure covering panel as defined in claim 1 in which said fluid circulating channels extend continuously between opposite of said panel edge portions hidden from exterior view by said face layer portion; and in which fluid circulating header portions extend along said opposite panel edge portions interiorly of said face layer portion and in fluid communication with said fluid circulating channels, said fluid circulating connector means being fluid flow connected with said header portions at said opposite panel edge portions.

12. In a simulated exterior structure covering panel as defined in claim 1 in which said fluid circulating channels extend continuously between opposite of said panel edge portions hidden from exterior view by said face layer portion, a multiplicity of fluid bridging channels between certain of said channels hidden from exterior view by said face layer portion.

13. In a simulated exterior structure covering panel as defined in claim 1 in which said fluid circulating channels extend continuously between opposite of said panel edge portions, a multiplicity of fluid bridging channels between certain of said channels, both said fluid circulating channels and said fluid bridging channels remaining hidden from exterior view by said face layer portion; and in which fluid circulating header portions extend along said opposite panel edge portions interiorly of said face layer portion and in fluid communication with said fluid circulating channels, said fluid circulating connector means being fluid flow connected with said header portions at said opposite panel edge portions.

14. In a simulated exterior structure covering panel as defined in claim 1 in which an interiorly opening recess is located in said panel lower edge portion and at and opening edgewise through one of said panel side edge portions, said recess being exteriorly hidden from view by at least said face layer portion and thereby being exteriorly hidden from view when said panel is in a panel assemblage; and in which certain of said fluid circulating connector means opens into said panel lower edge portion recess.

15. In a simulated exterior structure covering panel assemblage for solar heat collection; the combination of: a multiplicity of individual panels assembled edge portion to edge portion substantially in standard panel exterior structure covering fashion with all of said panels in said assemblage presenting an exterior face layer appearance simulating an assemblage of said standard panels such as panels of standard roofing and siding including standard shingles, tile and the like; each of said individual panels including a relatively thin non-transparent plastic exterior face layer portion having reasonable heat absorption and transfer characteristics and exteriorly simulating said standard panels, interior structure means defining a multiplicity of fluid circulating channels continuously between certain panel edge portions interiorly closed between said panel edge portions and directly underlying and exteriorly covered by said exterior face layer portion hidden from face layer view by said face layer portion, said interior structure means integrating said face layer portion and said fluid circulating channels into a structure covering panel having structural strength at least substantially equivalent to the standard structure covering materials being simulated, fluid circulating connection means at certain of said panel edge portions for fluid flow connecting said panel fluid circulating channels into an assemblage fluid circulating solar heat collecting network without substantially altering said standard panel assemblage simulation including retaining all of said fluid circulating channels of said individual panels and said fluid circulating connection means hidden from face layer exterior view.

16. In a simulated exterior structure covering panel assemblage as defined in claim 15 in which in normal positioning of said panels in said assemblage, lower edge portions of said panels have edge opening grooves therein throughout the extent thereof with upper edge portions of next lower panels positioned in said panel lower edge portion grooves while still retaining said fluid circulating channels and said fluid circulating connection means hidden from face layer exterior view.

17. In a simulated exterior structure covering panel assemblage as defined in claim 15 in which in normal positioning of said panels in said assemblage, lower edge portions of said panels have edge opening grooves therein throughout the extent thereof with upper edge portions of next lower panels positioned in said panel lower edge portion grooves, said panel lower edge portion grooves being positioned spaced interiorly from overall exterior extension of said panel lower edge portions and in said assemblage with panel upper edge portions presenting an exterior appearance simulating downwardly overlapped standard panels while still retaining said fluid circulating channels and said fluid circulating connection means hidden from face layer exterior view.

18. In a simulated exterior structure covering panel assemblage as defined in claim 15 in which said interior structure means includes a layer of thermal insulation interiorly underlying said fluid circulating channels throughout said panel assemblage interiorly insulating said fluid circulating channels.

19. In a simulated exterior structure covering panel assemblage as defined in claim 15 in which in normal positioning of said panels in said assemblage, lower edge portions of said panels have edge opening grooves therein throughout the extent thereof with upper edge portions of next lower panels positioned in said panel lower edge portion grooves, at least certain of said fluid circulating connection means fluid flow connecting said fluid circulating channels of adjacent panels at said panel lower edge portion grooves into said assemblage fluid circulating network while still retaining said fluid circulating channels and said fluid circulating connection means hidden from face layer exterior view.

20. In a simulated external structure covering panel assemblage as defined in claim 15 in which said panel assemblage constitutes only a part of an overall exterior structure covering panel assemblage with said overall panel assemblage including an adjacent panel assemblage substantially the same in exterior appearance with the panels thereof being free of said fluid circulating channels and said fluid circulating connection means so as to not form a part of said assemblage fluid circulating solar heat collecting network while still simulating said standard panels and an overall standard panel assemblage.

21. In a simulated exterior structure covering panel assemblage as defined in claim 15 in which at least one panel of said assemblage has a structure pipe opening therethrough between exterior and interior extremities of said panel, sealing means at edges of said pipe opening sealing off said panel fluid circulating channels at said pipe opening, said panel fluid circulating channels being interconnected adjacent said pipe opening permitting fluid flow around said pipe opening without substantially interrupting said assemblage fluid circulating network and while still retaining said fluid circulating channels hidden from exterior view.

22. In a simulated exterior structure covering panel assemblage as defined in claim 15 in which said panel assemblage terminates generally downwardly at lower edge portions of lowermost of said panels and a main lower header is assembled with said lower edge portions of said lowermost panels in said panel assemblage, said fluid circulating connection means of said lowermost panels fluid flow connecting said panel fluid circulating channels of said lowermost panels into said main lower header while still retaining said panel fluid circulating channels and said fluid circulating connection means hidden from exterior view.

23. In a simulated exterior structure covering panel assemblage as defined in claim 15 in which in normal positioning of said panels in said assemblage, lower edge portions of said panels have edge opening grooves therein throughout the extents thereof with upper edge portions of next lower panels positioned in said panel lower edge portion grooves while still retaining said fluid circulating channels and said fluid circulating connection means hidden from face layer exterior view; and in which said panel assemblage terminates generally downwardly at said lower edge portions of lowermost of said panels and a main lower header is assembled with said lower edge portions of said lowermost panels received in said edge opening grooves in said panel assemblage, said fluid circulating connection means of said lowermost panels fluid flow connecting said panel fluid circulating channels of said lowermost panels into said groove positioned main lower header while still retaining said panel fluid circulating channels and said fluid circulating connection means hidden from exterior view.

24. In a simulated exterior structure covering panel assemblage as defined in claim 15 in which said panel assemblage terminates generally upwardly at upper edge portions of uppermost of said panels and a main upper header is assembled with said upper edge portions of said uppermost panels in said panel assemblage, said fluid circulating connection means of said uppermost panels fluid flow connecting said panel fluid circulating channels of said uppermost panels into said main upper header while still retaining said panel fluid circulating channels and said fluid circulating connection means hidden from exterior view.

25. In a simulated exterior structure covering panel assemblage as defined in claim 15 in which said panel assemblage terminates generally upwardly at upper edge portions of uppermost of said panels and a main upper header is assembled overlapping said upper edge portions of said uppermost panels in said panel assemblage, said fluid circulating connection means of said uppermost panels fluid flow connecting said panel fluid circulating channels of said uppermost panels exteriorly of said panel upper edge portions into said main upper header while still retaining said panel fluid circulating channels and said fluid circulating connection means hidden from exterior view.

26. In a simulated exterior structure covering panel assemblage as defined in claim 15 in which in normal positioning of said panels in said assemblage, lower edge portions of said panels have edge opening grooves therein throughout the extents thereof with upper edge portions of next lower panels positioned in said panel lower edge portion grooves; in which said panel assemblage terminates generally downwardly at said lower edge portions of lowermost of said panels and a main lower header is assembled with said lower edge portions of said lowermost panels received in said edge opening grooves in said panel assemblage, said fluid circulating connection means of said lowermost panels fluid flow connecting said panel fluid circulating channels of said lowermost panels into said groove positioned main lower header; in which said panel assemblage terminates generally upwardly at upper edge portions of uppermost of said panels and a main upper header is assembled overlapping said upper edge portions of said uppermost panels in said panel assemblage, said fluid circulating connection means of said uppermost panels fluid flow connecting said panel fluid circulating channels of said uppermost panels exteriorly of said panel upper edge portions into said main upper header; and in which all of said panels are connected together and to said lower and upper headers while still retaining said panel fluid circulating channels and said fluid circulating connection means hidden from exterior view.

* * * * *